United States Patent
Kawai et al.

(10) Patent No.: US 7,290,795 B2
(45) Date of Patent: Nov. 6, 2007

(54) GARNISH CLIP FOR CURTAIN SHIELD AIRBAG

(75) Inventors: Yasuhiro Kawai, Toyohashi (JP); Koya Teshima, Anjo (JP)

(73) Assignee: Newfrey LLC, Newark, DE (US)

( * ) Notice: Subject to any disclaimer, the term of this patent is extended or adjusted under 35 U.S.C. 154(b) by 328 days.

(21) Appl. No.: 11/152,108

(22) Filed: Jun. 15, 2005

(65) Prior Publication Data

US 2005/0285374 A1 Dec. 29, 2005

(30) Foreign Application Priority Data

Jun. 24, 2004 (JP) ............................ 2004-186691

(51) Int. Cl.
*B60R 21/16* (2006.01)
*B60R 21/20* (2006.01)

(52) U.S. Cl. ...................... 280/730.2; 24/297

(58) Field of Classification Search ............ 280/728.2, 280/730.2; 411/41, 45–48; 24/297, 457, 24/458; 403/397; 248/71, 74.3
See application file for complete search history.

(56) References Cited

U.S. PATENT DOCUMENTS

| | | | | |
|---|---|---|---|---|
| 2,937,834 A | * | 5/1960 | Orenick et al. ............... 248/71 |
| 5,419,584 A | * | 5/1995 | Halford .................... 280/728.2 |
| 6,394,695 B1 | | 5/2002 | Chausset ..................... 403/397 |
| 6,431,585 B1 | * | 8/2002 | Rickabus et al. ......... 280/728.3 |
| 7,155,783 B2 | * | 1/2007 | Nessel et al. .................. 24/289 |
| 7,178,205 B2 | * | 2/2007 | Nessel et al. .................. 24/289 |
| 7,207,529 B2 | * | 4/2007 | Rosemann et al. ........... 248/71 |

FOREIGN PATENT DOCUMENTS

| JP | 2002-211345 | 7/2002 |
|---|---|---|
| JP | 2003-104156 | 4/2003 |

* cited by examiner

*Primary Examiner*—Ruth Ilan
*Assistant Examiner*—Tiffany Webb
(74) *Attorney, Agent, or Firm*—Miles & Stockbridge P.C.

(57) ABSTRACT

A garnish clip comprises a body attachment portion for attachment to a vehicle body and a garnish attachment portion for attachment to a garnish. The garnish attachment portion comprises a plate-shaped base with one end connected to the body attachment portion and a plate-shaped garnish engagement portion connected to the other end of the base by a U-shaped connection. The garnish engagement portion and the base are also connected by a thin breakable connector near the body attachment portion. Ribs on the garnish attachment portion provide rigidity to limit opening of the garnish engagement portion away from the body attachment portion when the airbag deploys and the thin connector breaks due to collision or roll-over forces.

7 Claims, 5 Drawing Sheets

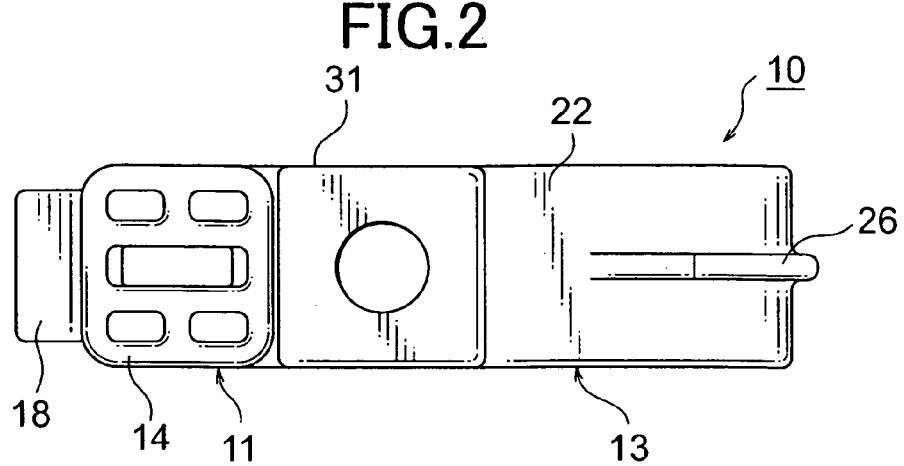
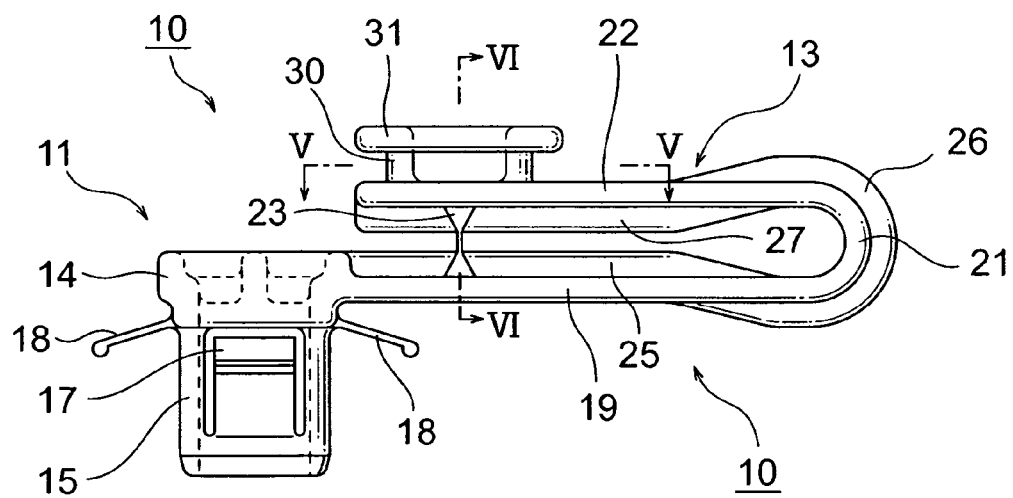
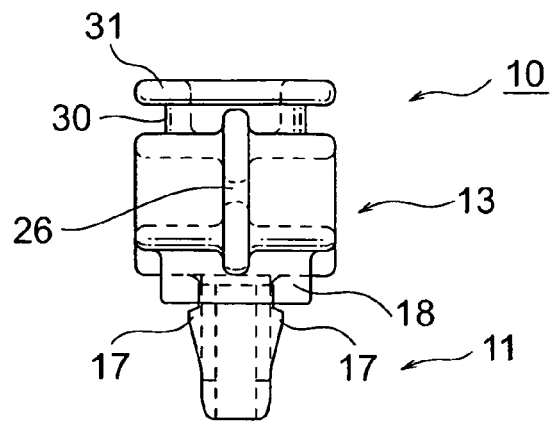

GARNISH CLIP FOR CURTAIN SHIELD AIRBAG

CROSS-REFERENCE TO RELATED APPLICATION

This application claims the benefit of Japanese Application No. 2004-186691 filed Jun. 24, 2004, incorporated herein by reference.

BACKGROUND OF THE INVENTION

The present invention relates to a garnish clip for attaching a curtain shield airbag to a portion of a vehicle body such as a front pillar of a car.

A device for attaching a curtain shield airbag to a front pillar with a garnish is disclosed in Japanese Unexamined Patent Application Publication [Kokai] No. 2002-211345 (Patent Document 1). A portion of the curtain shield airbag extending towards the front pillar is housed and held by a movable portion of the garnish that forms deployment space. In Patent Document 1, the garnish is secured to the pillar by a nut and a bolt. The curtain shield airbag can be deployed to protect the head of a vehicle occupant if a collision or rollover occurs.

A garnish for holding a curtain shield airbag to a pillar is also disclosed in Kokai No. 2003-104156 (Patent Document 2). The garnish consists of a face and a bracket. A portion of the bracket is fixed to the face, and another portion detachably engages the face. The bracket has an engagement portion that is mounted in a pillar mounting hole at the position of a detachable connector. The curtain shield airbag is surrounded by the face and the bracket to house and hold the airbag in place. When the curtain shield airbag is deployed, the detachable connector comes off.

A clip is disclosed in U.S. Pat. No. 6,394,695 (Patent Document 3) in which trim such as a garnish is fastened near a pillar so that the garnish does not fly off when it is released from the pillar for rapid deployment of a curtain shield airbag. The clip consists of a first male portion for snapping the clip into a hole in the pillar, a female portion that is snapped into the trim, and a second male portion that extends from the first male portion and is snapped into the female portion and connected to the trim via the female portion. A flexible strap connects the first male portion and the female portion. When the female portion separates from the second male portion, the strap keeps the trim from flying off the pillar.

The attachment structures for curtain shield airbags disclosed in Patent Documents 1-3 keep a garnish from flying off a pillar in the direction of a vehicle occupant when a curtain shield airbag is deployed, and improve the safety of a vehicle occupant, but all have deficiencies. The garnish in Patent Document 1 has to be attached using nuts and bolts. This operation makes an automobile assembly line more complex and is time-consuming because of the complexity of the operation. Also, the attachment portion of the garnish has to have a specific configuration in order to ensure that there is enough space for curtain shield airbag deployment. In Patent Document 2, the garnish is attached using a bracket and a garnish face which have to be secured tightly at multiple points—a complicated operation. The clip in Patent Document 3 snaps into place, but the attachment operation is troublesome, because the strap has to be folded properly.

BRIEF DESCRIPTION OF THE INVENTION

An object of the present invention is to provide a garnish clip with a simple configuration that holds a curtain shield airbag, that can be attached easily to a portion of a vehicle body such as a pillar, and that minimizes movement of the garnish in the direction of a vehicle occupant, by restricting movement of the garnish away from the vehicle body when a curtain shield airbag is deployed.

In one non-limiting embodiment, the present invention provides a garnish clip for attaching a garnish that houses a portion of a curtain shield airbag to a portion of a vehicle body such as a pillar, wherein the clip comprises a body attachment portion attached to a vehicle body and a garnish attachment portion attached to a garnish. The garnish attachment portion comprises a plate-shaped base connected at one end to the body attachment portion, and connected at an opposite end to a plate-shaped garnish engagement portion via a U-shaped connection, so as to oppose the base.

The base and the garnish engagement portion are connected at a position adjacent to the body attachment portion by a breakable connector. The connector is broken by impact on the garnish when the curtain shield airbag deploys, and restrains the airbag until broken. When the connector is broken, the garnish engagement portion moves away from the base to provide space between the garnish and the body for the deployment of the curtain shield airbag. Ribs on the garnish attachment portion provide rigidity to limit opening of the garnish engagement portion away from the base when the connector is broken. This prevents the garnish from coming off the vehicle body and restrains the garnish so movement in the direction of a vehicle occupant is minimized. The clip can be easily attached to a pillar of the body without the use of nuts and bolts, and the garnish can be easily attached to the garnish engagement portion.

BRIEF DESCRIPTION OF THE DRAWINGS

The invention will be further described in conjunction with the accompanying drawings illustrating a preferred (best mode) embodiment, and wherein:

FIG. 2 is a plan view of a garnish clip of the invention;

FIG. 3 is a front view of the clip in FIG. 2;

FIG. 4 is a right side view of the clip in FIG. 3;

DETAILED DESCRIPTION OF THE INVENTION

The following is an explanation of an example of the present invention with reference to the drawings.

Figure 1:
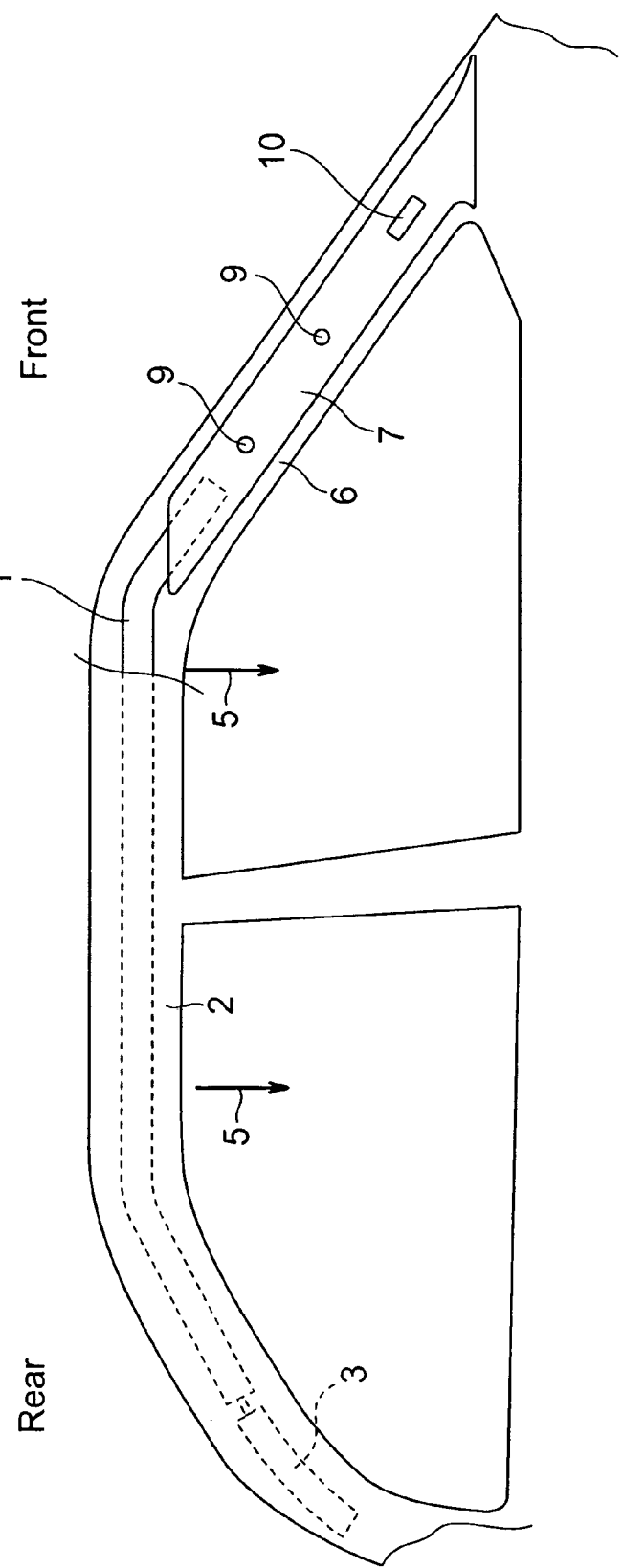
FIG. 1 is a diagram showing a garnish attached to a front pillar of a vehicle using a clip of the invention and showing a curtain shield airbag is attached to the body of the vehicle.
Figure 5:
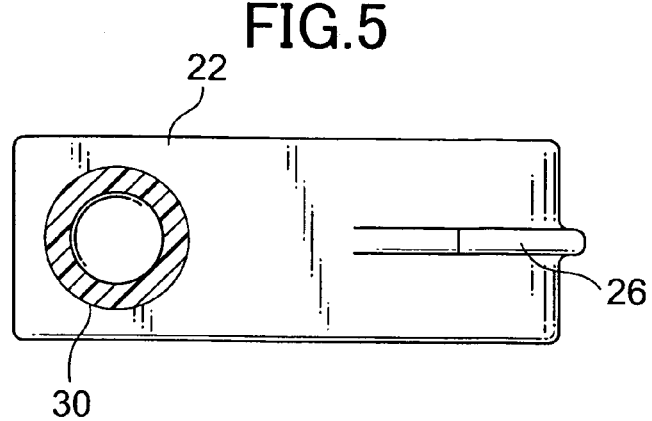
FIG. 5 is a cross-sectional view of the clip along line V-V in FIG. 3.

FIG. 1 shows how a curtain shield airbag 1 is attached to a vehicle such as an automobile. Because a curtain shield airbag primarily protects the head of a vehicle occupant, it is housed and held in a portion of the vehicle body such as the upper rail of a door window, from front to rear in a manner concealed from a vehicle occupant. Impact on the vehicle in a collision or rollover causes gas from a compressed gas source 3 (called an inflator) to rapidly deploy the curtain shield airbag downward (in the direction of arrows 5) along the door window in order to protect the head of a vehicle occupant. A portion of the curtain shield airbag 1 is housed in and held by a garnish 7 in the front pillar 6 at the front of the vehicle body. In this example, the garnish 7 is detachably attached along the front pillar 6 using simple push-in fasteners 9 and the garnish clip 10 of the present invention.

The following is a more detailed explanation of the garnish clip 10 with reference to FIG. 2 through FIG. 6. The clip 10 is preferably an integrally molded product manufactured by injection molding, and comprises a body attachment portion 11 for attachment to a portion of a vehicle body such as a front pillar 6, and a garnish attachment portion 13 for attachment to the garnish 7. The body attachment portion 11 has a structure allowing it to be inserted into and then engage a mounting hole in a portion of a vehicle body such as a front pillar. The body attachment portion 11 includes a head 14, and legs 15 extending downward from the head. The legs 15 have a pair of elastic pawls 17 extending up and out toward the head 14. The legs 15 preferably have a square shape in cross-section so as not to rotate axially once inserted into a square-shaped mounting hole in the pillar 6. A pair of plate-shaped elastic tabs 18 extend downward and outward below the head 14. The tabs assist in securing the engaged pawls 17 inside the mounting hole in the pillar 6. The body attachment portion 11 can have a different shape. For example, it can have an anchor shape for insertion into and engagement with a mounting hole in the pillar 6.

Figure 6:
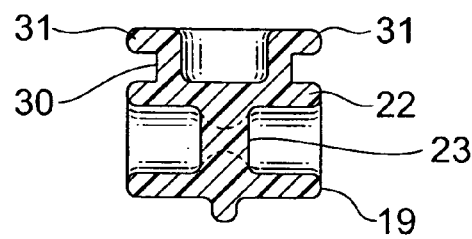
FIG. 6 is a cross-sectional view of the clip along line VI-VI in FIG. 3.

The garnish attachment portion 13 comprises a plate-shaped base 19 connected at one end to the head 14 of the body attachment portion 11, and connected at an opposite end to a plate-shaped garnish engagement portion 22 by a U-shaped connection 21, so as to oppose the base 19 in a parallel manner. The base 19 and the garnish engagement portion 22 are connected at a position adjacent to the head 14 of the body attachment portion 11, by a breakable thin connector 23. The thin connector 23, as shown in FIG. 6, preferably has a constant width, and is strong enough to remain unbroken until the curtain shield airbag is deployed. The impact on the garnish at this time causes the thin connector 23 to break as the curtain shield airbag deploys rapidly. Until then, the thin connector 23 restrains the airbag.

When the thin connector 23 breaks, the garnish engagement portion 22 moves away from the base 19 at a position near the head 14 of the body attachment portion 11, but the garnish attachment portion 13 is rigid enough to limit such movement. This rigidity is at least in part provided by ribs (protrusions) 25, 26, 27 extending lengthwise on the base 19, the U-shaped connection 21, and the garnish engagement portion 22. Ribs 25 and 27 protrude from opposing planes where the base 19 and the garnish engagement portion 22 oppose one another. The rib 26 protrudes and bends outward from the U-shaped connection 21. Movement of the garnish engagement portion 22 away from the base provides space between the garnish and the vehicle body for the deployment of the curtain shield airbag.

Figure 7:
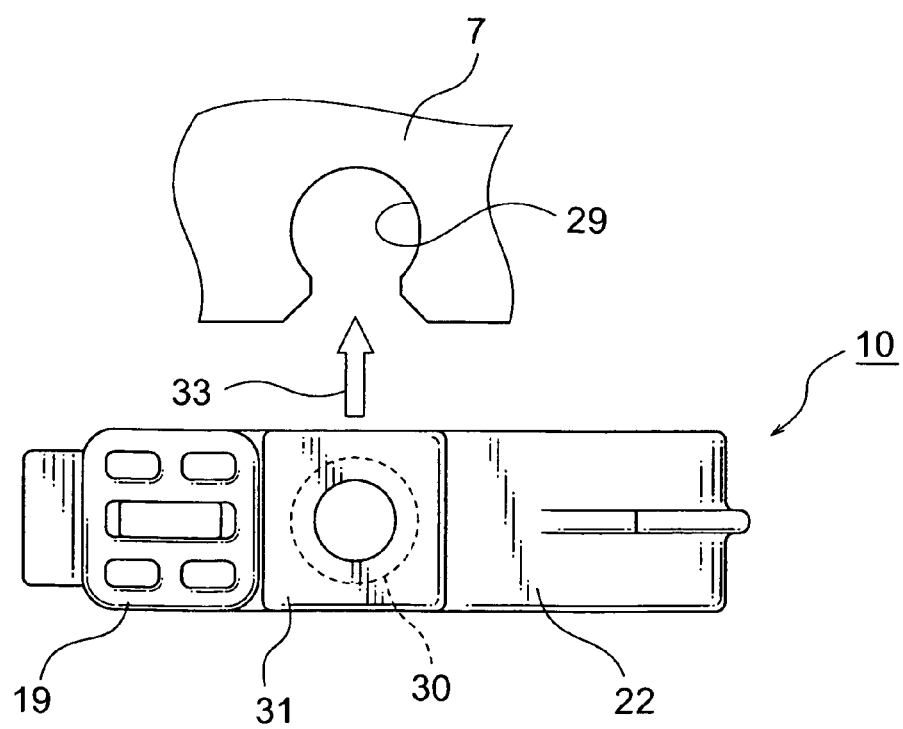
FIG. 7 is a plan view showing how the clip in FIG. 2 is attached to a garnish.

The garnish attachment portion is flexible at the interfaces between the U-shaped connection 21 and the base 19 and the garnish engagement portion 22. The flexibility at the interfaces with the U-shaped connection 21 forms a hinge that allows the garnish engagement portion 22 to move away from the base 19 at an end of the body attachment portion 11. However, opening of the garnish engagement portion 22 away from the base 19 is resisted; movement of the garnish attached to the garnish attachment portion 11 away from the vehicle body is resisted; and movement of the garnish towards the vehicle occupant is resisted To connect the garnish 7 to the clip 10, a garnish insertion tube 30 is provided on the garnish engagement portion 22 for sliding engagement with a recess 29 in the garnish 7 (see arrow 33 in FIG. 7). The height of the insertion tube 30 depends on the thickness of the garnish, and a flange 31 is formed at the top to keep the tube from moving axially out of the recess 29. The tube 30 is preferably cylindrical with an outer diameter that allows the tube to be squeezed through a tapered entrance to the recess 29. When the tube fits in the recess 29, separation of the garnish 7 from the clip 10 is unlikely. Instead of tube 30 and recess 29, another mechanism can be used for connecting the garnish 7 to the clip 10, if desired.

Figure 8:
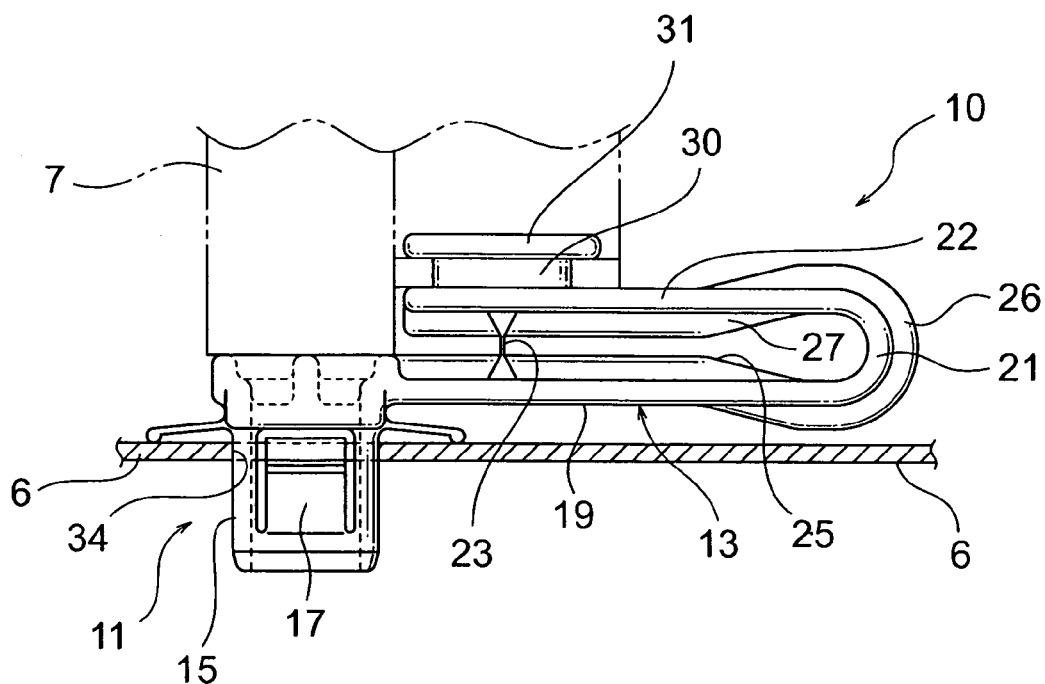
FIG. 8 is a front view showing a garnish attached to a front pillar using the clip in FIG. 3, before the connection is broken.
Figure 9:
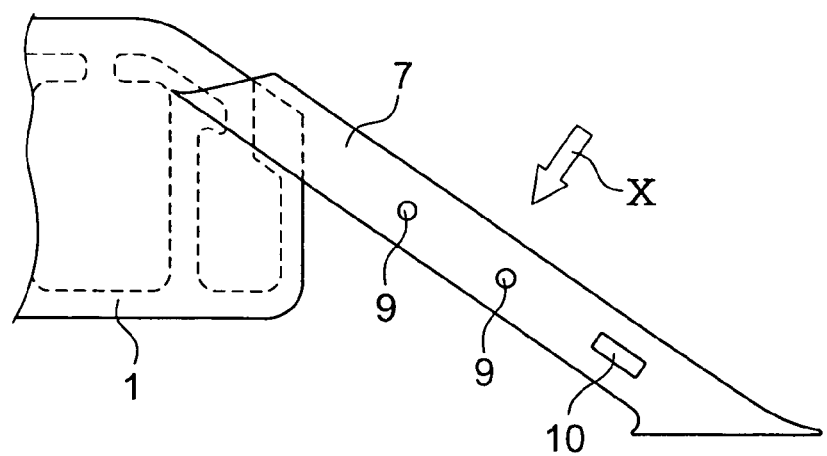
FIG. 9 is a diagram used to explain what happens in the vicinity of the front pillar when the curtain shield airbag is deployed.
Figure 10:
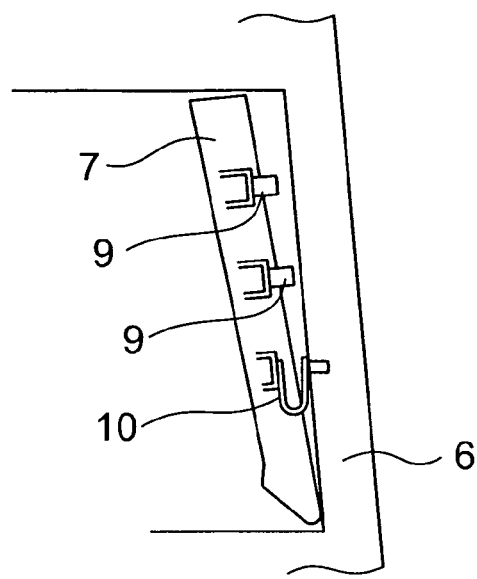
FIG. 10 is an explanatory diagram as seen from arrow X in FIG. 9.

The clip 10 of the present invention is preferably sent to a vehicle assembly line after it has been attached to a garnish 7. This saves time and effort compared to attachment of a clip to a garnish at the assembly line. As shown in FIG. 8, the garnish 7 is attached to the front pillar 6 using the clip 10 (and push-in fasteners 9). Legs 15 on the body attachment portion 11 of the clip 10 are inserted into an attachment hole 34 in the front pillar 6, so that pawls 17 engage regions of the attachment hole, and the elastic tabs 18 engage the front pillar 6, whereby the clip 10 is secured to the front pillar.

Figure 11:
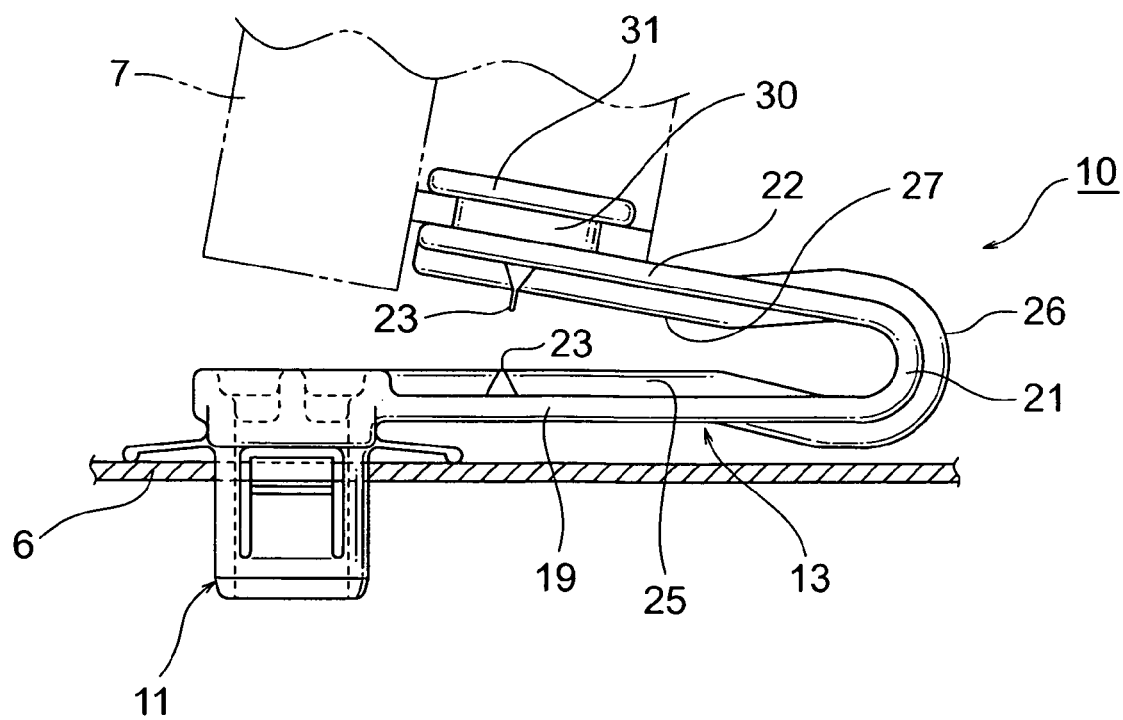
FIG. 11 is a front view showing the clip and garnish of FIG. 8 after the connection is broken.

As shown in FIG. 11, the thin connector 23 breaks when the garnish 7 is impacted by deployment of the curtain shield airbag. Until the thin connector 23 breaks, the rapidly deploying curtain shield airbag 1 is prevented from impacting the garnish. After the thin connection 23 breaks, the ribs 25-27 provide the rigidity to limit opening of the garnish engagement portion 22 away from the base 19. After maintaining space between it and the pillar 6 for curtain shield airbag deployment, the garnish 7 restrains further approach of the airbag towards the vehicle occupant in order to minimize danger to the vehicle occupant. In this way, vehicle occupant safety is ensured.

While a preferred embodiment has been shown and described, changes can be made without departing from the principles and spirit of the invention, the scope of which is defined in the accompanying claims.

What is claimed is:

1. A garnish clip for attaching a garnish, that holds a curtain shield airbag, to a portion of a vehicle body, comprising:
   a body attachment portion for attachment to the vehicle body; and
   a garnish attachment portion for attachment to the garnish,
   wherein the garnish attachment portion comprises a base with one end connected to the body attachment portion and an opposite end attached to one end of a garnish engagement portion by a U-shaped connection,
   wherein the base and the garnish engagement portion are connected at a position adjacent to the body attachment portion by a breakable connector, so that the base and the garnish engagement portion oppose one another, wherein the breakable connector breaks when the airbag deploys, and the garnish engagement portion moves away from the base adjacent to the body attachment portion, and wherein the garnish attachment portion has sufficient rigidity to limit such movement.

2. The clip described in claim 1, wherein ribs extend lengthwise along the base, the U-shaped connection, and the garnish engagement portion, and wherein the ribs provide rigidity to the garnish attachment portion that resists movement of the garnish engagement portion away from the base.

3. The clip described in claim 2, wherein the ribs on the base and the garnish engagement portion protrude so as oppose one another where the base and the garnish engagement portion oppose one another, wherein the rib on the U-shaped connection faces outwards, and wherein the U-shaped connection bends to permit movement of the garnish engagement portion away from the base at a position adjacent to the body attachment portion.

4. The clip described in claim 1, wherein a garnish insertion tube is provided on the garnish engagement portion for sliding engagement with a garnish recess.

5. The clip described in claim 1, wherein the body attachment portion has legs with corresponding pawls for insertion into an attachment hole in a vehicle body.

6. A garnish clip for attaching a garnish, that holds a curtain shield airbag, to a portion of a vehicle body, comprising:

a body attachment portion for attachment to the vehicle body; and a garnish attachment portion for attachment to the garnish, wherein the garnish attachment portion is constructed to provide a space for retaining a portion of an airbag, and wherein the garnish attachment portion has a breakable connector that is broken when the airbag deploys, so as to permit limited expansion of the space and limited movement of a garnish away from the body attachment portion.

7. The clip described in claim 6, wherein one end of the garnish attachment portion has a hinge to permit said movement, and wherein the breakable connector is spaced from the hinge.

* * * * *